(12) United States Patent
Chu et al.

(10) Patent No.: US 7,671,734 B2
(45) Date of Patent: Mar. 2, 2010

(54) FOOTPRINT LOCATION SYSTEM

(75) Inventors: Hao-Hua Chu, Taipei (TW);
Shun-Yuan Yeh, Taipei (TW); Chon-In Wu, Taipei (TW); Kenji Okuda, Taipei (TW)

(73) Assignee: National Taiwan University, Taipei (TW)

( * ) Notice: Subject to any disclaimer, the term of this patent is extended or adjusted under 35 U.S.C. 154(b) by 366 days.

(21) Appl. No.: 11/678,495

(22) Filed: Feb. 23, 2007

(65) Prior Publication Data
US 2008/0204223 A1    Aug. 28, 2008

(51) Int. Cl.
*G08B 13/00* (2006.01)
(52) U.S. Cl. .............................. 340/539.13; 342/357.08; 345/158
(58) Field of Classification Search ............ 340/539.13; 342/357.08; 345/158
See application file for complete search history.

(56) References Cited

U.S. PATENT DOCUMENTS

| | | | |
|---|---|---|---|
| 4,703,445 A * | 10/1987 | Dassler | 702/160 |
| 6,788,200 B1 * | 9/2004 | Jamel et al. | 340/539.13 |
| 7,265,666 B2 * | 9/2007 | Daniel | 340/539.11 |
| 7,474,206 B2 * | 1/2009 | Bertagna et al. | 340/539.13 |
| 7,501,945 B2 * | 3/2009 | Young et al. | 340/539.2 |
| 2005/0068228 A1 * | 3/2005 | Burchfiel | 342/357.06 |
| 2007/0003915 A1 * | 1/2007 | Templeman | 434/247 |
| 2007/0211451 A1 * | 9/2007 | Chung | 362/103 |
| 2008/0204223 A1 * | 8/2008 | Chu et al. | 340/539.13 |
| 2009/0041297 A1 * | 2/2009 | Zhang et al. | 382/103 |
| 2009/0079559 A1 * | 3/2009 | Dishongh et al. | 340/539.13 |

FOREIGN PATENT DOCUMENTS

JP        2004121267 A    *    4/2004

* cited by examiner

*Primary Examiner*—Daniel Wu
*Assistant Examiner*—Bradley E Thompson
(74) *Attorney, Agent, or Firm*—Birch, Stewart, Kolasch & Birch, LLP (57) ABSTRACT

A footprint location system installed on footwear is disclosed. A user simply has to wear the shoes to track his/her locations without any setup or calibration efforts. The footprint location system measures and tracks the displacement vectors along a trail of footprints. The position of a user can be determined by summing up the current and all previous displacement vectors. In addition to being infrastructure-free, the footprint location method does not have problems found in existing indoor location systems, such as obstacles, multi-path effects, signal noises, signal interferences, and dead spots.

14 Claims, 11 Drawing Sheets

FOOTPRINT LOCATION SYSTEM

BACKGROUND OF THE INVENTION

1. Field of the Invention

The present invention generally relates to a footprint location system, and more particularly to a footprint location system that can determine a user's position by summing up all displacement vectors 2. The Prior Arts Conventional indoor location systems usually need expensive infrastructure and maintenance to determine a user's position precisely. That might be the reason that the conventional indoor location systems have been seldom used in commercial applications ranging from family to enterprise.

A conventional indoor location system usually sets up sensing devices in particular positions to detect a user's position. In order to enhance accuracy, the conventional indoor location system needs to increase numbers of sensing devices, such as infrared, WiFi and weight detectors, and therefore largely increases the expense of equipments, installing, operating and maintenance of the system.

SUMMARY OF THE INVENTION

A primary objective of the present invention is to provide a footprint location system and method on footwear, which a user simply has to wear the footwear to track his/her locations without any setup or calibration efforts. The footprint location system measures and tracks displacement vectors along a trail of footprints, and then determines the user's position by summing tip all displacement vectors without any advanced infrastructure.

A secondary objective of the present invention is to provide a footprint location system and method on footwear, which can determine the user's physical location solely by using sensors installed on footwear. With ultrasonic infrared transmitters and receivers respectively installed on a first shoe and a second shoe of the footprint location system, it provides highly accurate coordinates due to a short distance (less than 1.5 meters) between them, thereby overcoming many problems found in existing indoor location systems, such as obstacles, multi-path effects, signal noises, signal interferences, and dead spots. Moreover, video detection devices can replace the ultrasonic infrared transmitters and receivers and achieves a similar result.

A tertiary objective of the present invention is to provide a footprint location system and method that integrates with force sensors to confirm footwear in contact with ground. The force sensors are used to avoid obtaining incorrect displacement vectors under unstable conditions and to identify the user moves forward, backward, left or right.

A further objective of the present invention is to provide a footprint location system and method that integrates with orientation sensors to obtain rotation angle to simplify computational requirements of the system.

A further objective of the present invention is to provide a footprint location system and method that integrates with radio frequency identification (RFID) tags and readers to obtain a user's current location to correct the user's position in real-time.

To achieve the objectives mentioned above, a footprint location system in accordance with the present invention comprises a first shoe, a second shoe, a vector measuring unit and a location calculation unit. The footprint location system determines a user's position by tracking a trail of footprints. The trail of the footprints implying direction and translation information comprises first footprints of the first shoe and second footprints of the second shoe.

The first shoe has two ultrasonic infrared receivers and the second shoe has an ultrasonic infrared transmitter. While a user wearing the first and the second shoes walks, a vector measuring unit measures displacement vectors between the first and second footprints based on coordinates provided by the ultrasonic infrared transmitters and the ultrasonic infrared receivers (or by a camera device and a characteristic picture). The location calculation unit then calculates the user's position by summing up the current and all previous displacement vectors with reference to a starting point without additional advanced infrastructure.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1A:
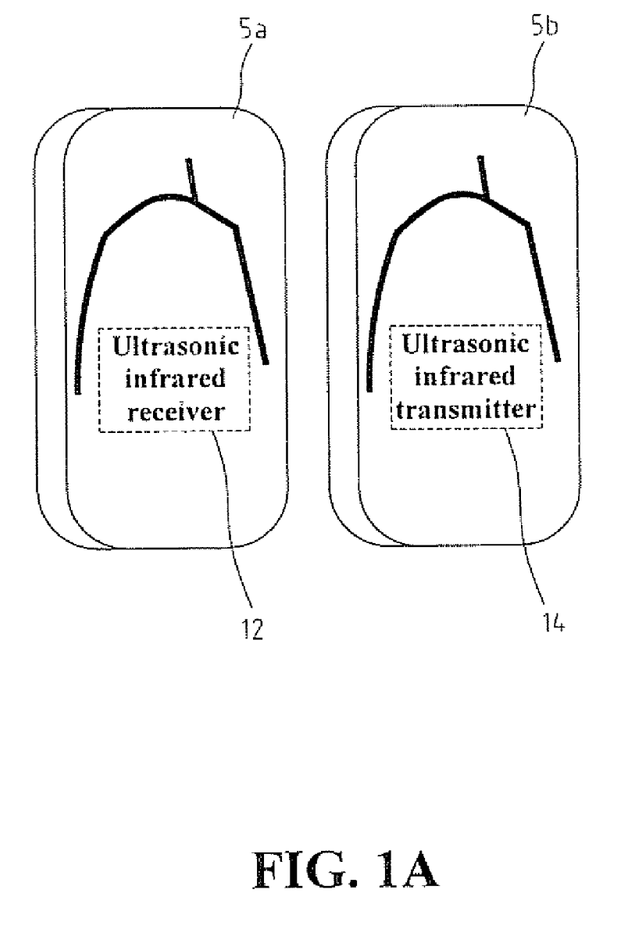
FIGS. 1A and 1B are schematic views of shoes according to the present invention.
Figure 1B:
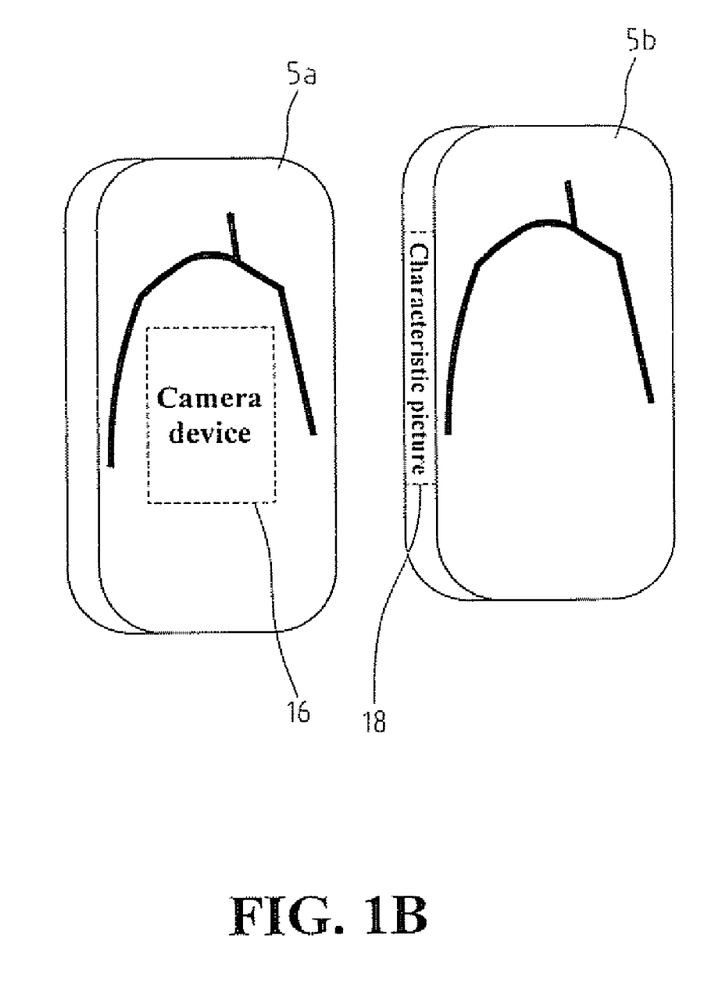
Figure 4A:
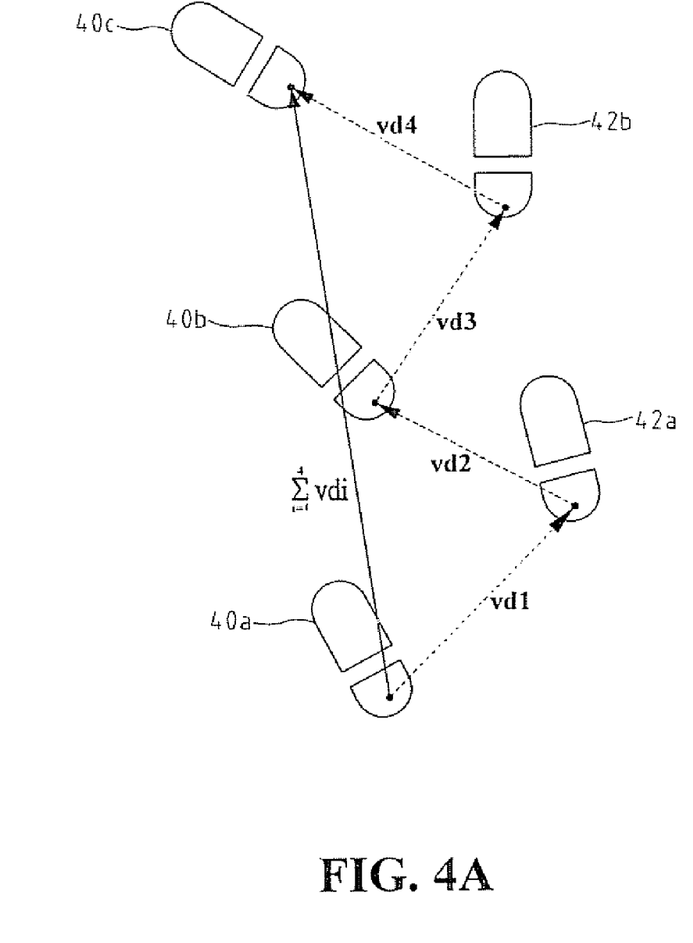
FIGS. 4A and 4B are schematic views showing a trail of the user's footprints in the footprint location system according to the present invention.

With reference to the drawings and in particular to FIGS. 1A and 1B, a footprint location system in accordance with the present invention comprises a first shoe 5a and a second shoe 5b. The first shoe 5a comprises measuring units, such as an ultrasonic infrared receiver 12 as shown in FIG. 1A, or a first video detection device (such as a camera device) 16 as shown in FIG. 1B, and generates first footprints 40a-40c as shown in FIG. 4A when both feet touch the ground. The second shoe 5b comprises measuring units, such as an ultrasonic infrared transmitter 14 as shown in FIG. 1A, or a second video detection device (such as a characteristic picture) 18 as shown in FIG. 1B, and generates second footprints 42a and 42b as shown in FIG. 4A when both feet touch the ground. Therefore, the footprint location system of the present invention can calculate a user's position by measuring every stride (the first footprints 40a-40c and the second footprints 42a-42b) generated by the user wearing the first shoe 5a and the second shoe 5b. In the following description two different embodiments according to the present invention will be presented. The major difference between these two embodiments is the measuring units installed in the first shoe 5a and the second shoe 5b. The method of determining the user's position is the same. The first video detection device (camera device) 16 and the easily recognizable second video detection device (characteristic picture) 18 can replace the ultrasonic infrared receiver 12 and the ultrasonic infrared transmitter 14 respectively.

Figure 2A:
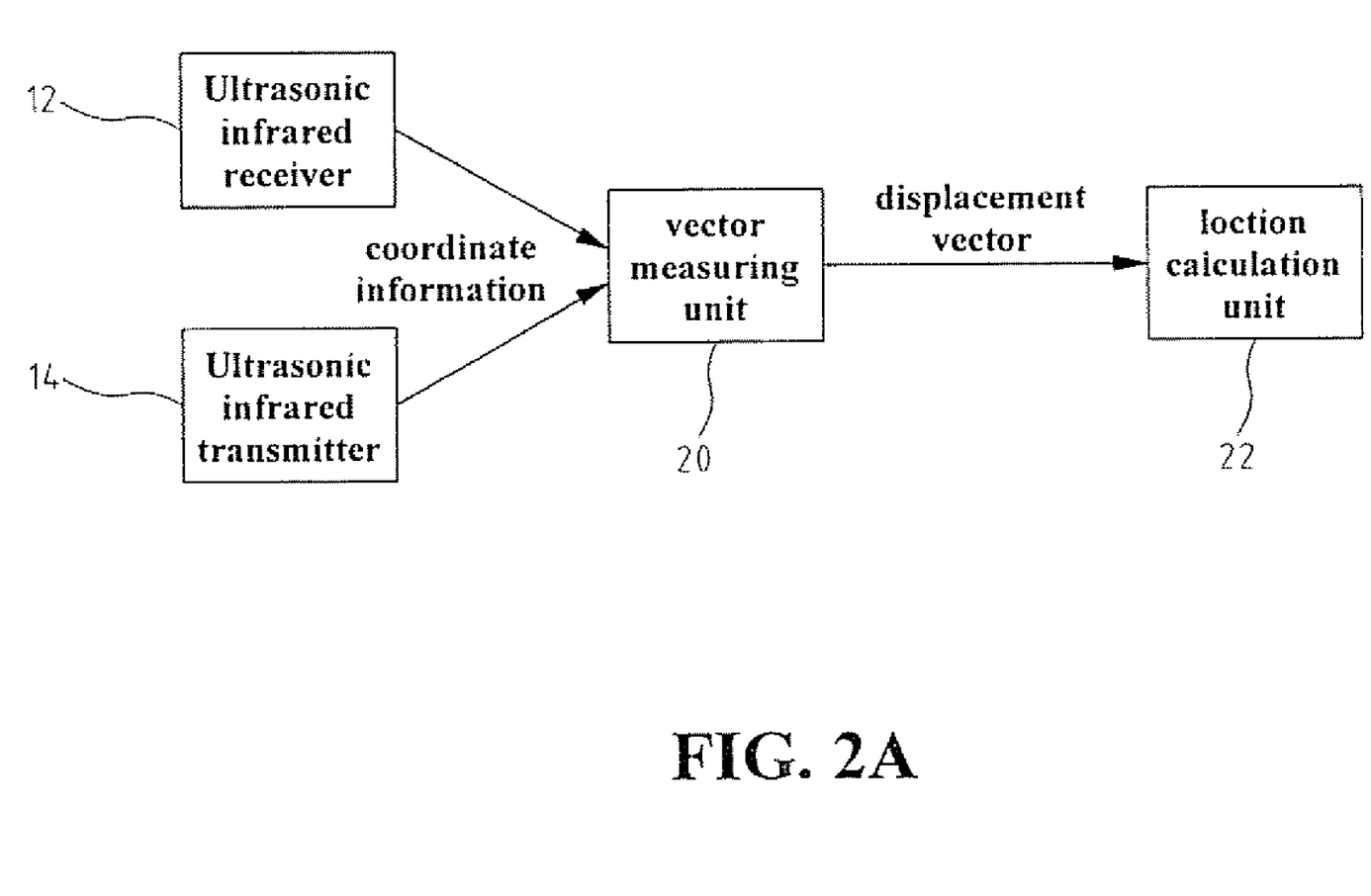
FIGS. 2A and 2B are schematic views of a footprint location system according to the present invention.
Figure 2B:
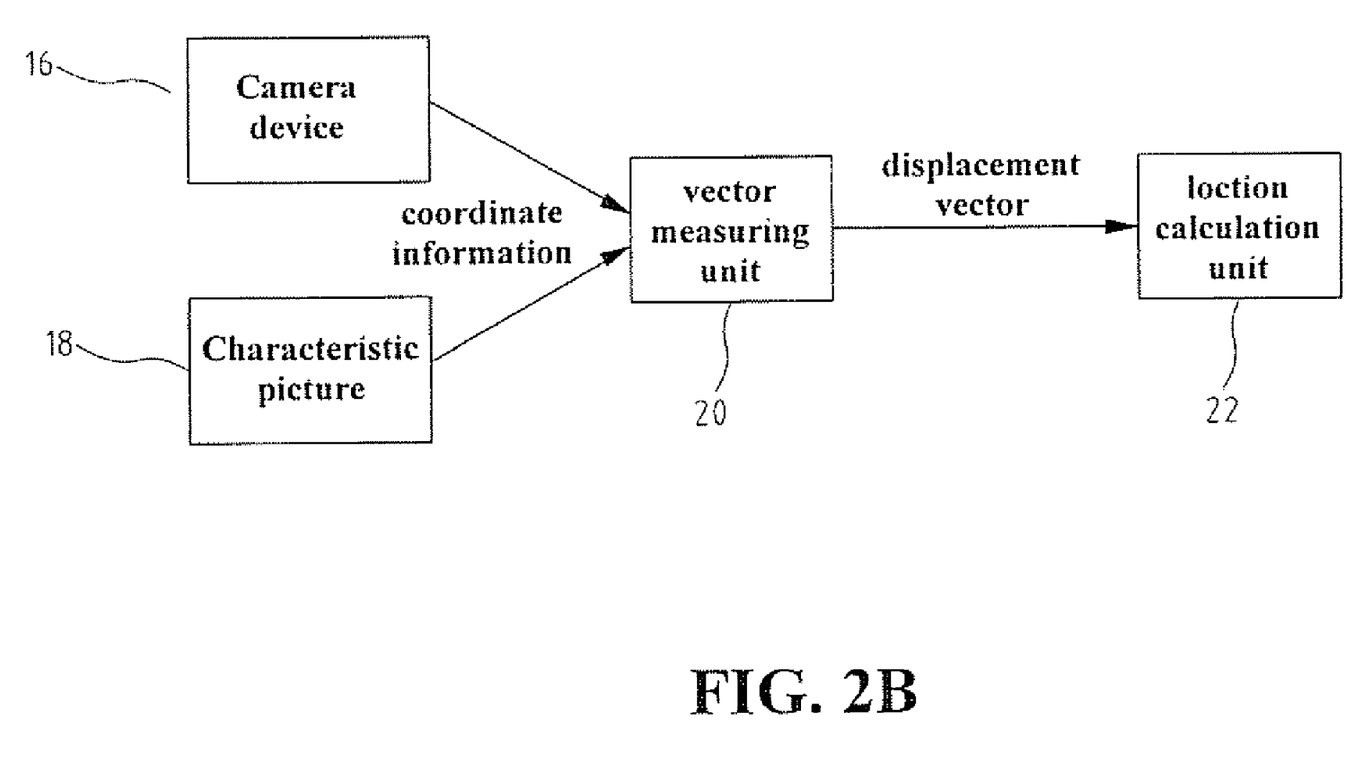

With reference to the drawings and in particular to FIGS. 2A-2B, the footprint location system of the present invention comprises an ultrasonic infrared receiver 12, an ultrasonic infrared transmitter 14, a vector measuring unit 20, and a location calculation unit 22 as shown in FIG. 2A, or a first video detection device (camera device) 16, a second video detection device (characteristic picture) 18, a vector measuring unit 20 and a location calculation unit 22 as shown in FIG. 2B.

Briefly, the vector measuring unit 20 measures displacement vectors Vdi (as shown in FIG. 4A) between the first footprint 40a-40c and the second footprint 42a and 42b based on coordinates provided by the ultrasonic infrared receivers 12 and the ultrasonic infrared transmitters 14 (or by the first video detection device 16 and the second video detection device 18). The location calculation unit 22 then calculates the user's position by summing up the current and all previous displacement vectors $$\left(\sum_{i=1}^{n} vdi\right)$$

with reference to a starting point.

Figure 3A:
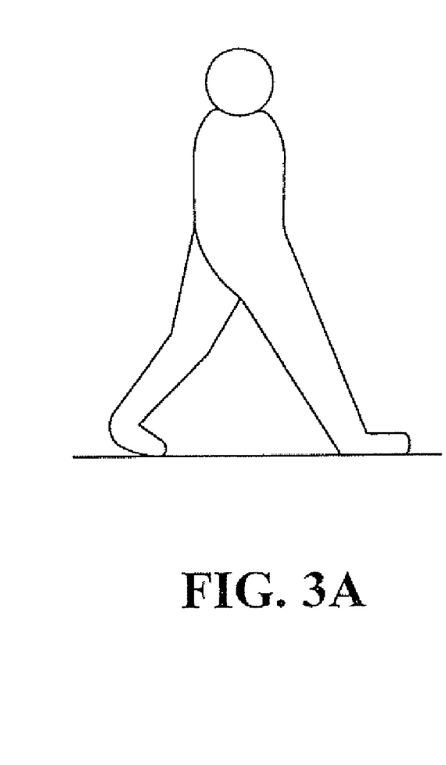
FIGS. 3A-3C are schematic views showing a user's walking status in the footprint location system according to the present invention.
Figure 3B:
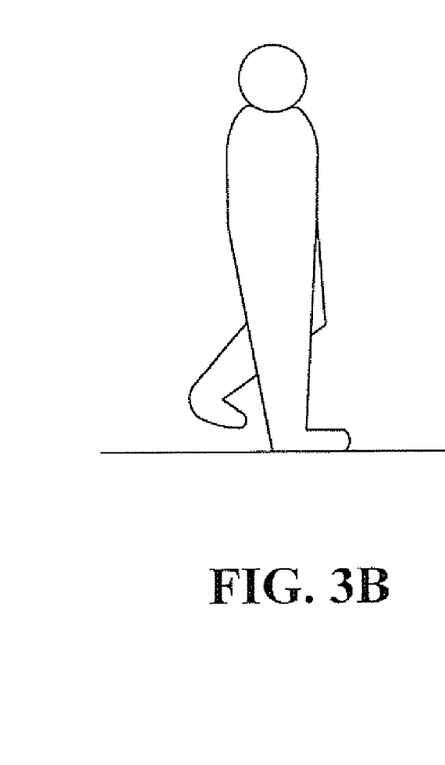
Figure 3C:
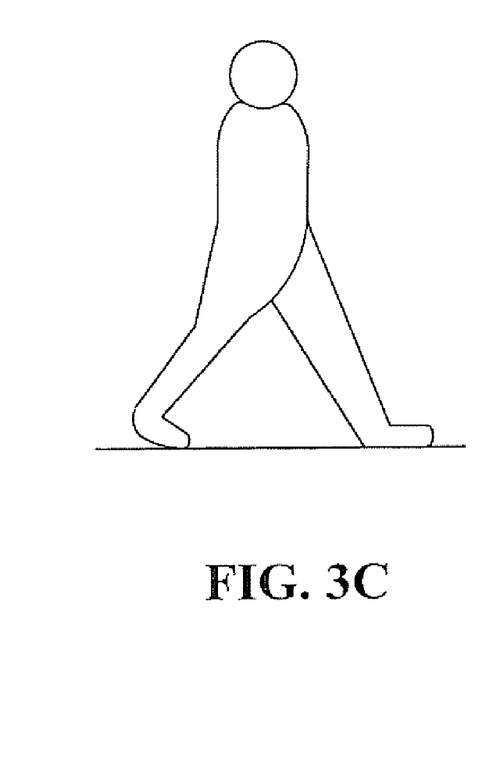

The human walking motion can be modeled by stance-phase kinematics as shown in FIGS. 3A-3C. FIG. 3A shows a heel strike stance; FIG. 3B shows a mid stance; and FIG. 3C shows a toe-off stance. Only in the heel strike stance and toe-off stance, both feet are in contact with the ground. In the mid stance, the body raises one foot and only one foot is in contact with the ground. The footprint location system of the present invention only measures displacement vectors Vdi under stable conditions (both feet touch the ground at the same time, as shown in FIGS. 3A and 3C) in consideration of accurateness. That means the footprint location system only measures the displacement vectors Vdi between the first footprints (40a, 40b and 40c) and the second footprints (42a and 42b) as shown in FIG. 4A.

With reference to the drawings and in particular to FIGS. 4A and 4B, the user walks 4 steps. When the first shoe 5a and the second shoe 5b are in contact with the ground at the same time (see FIG. 4A), the coordinates of ultrasonic infrared transmitters 14 on the second footprint are measured relative to a local coordinate system at the first footprint. The footprint location system of the present invention measures a displacement vector $Vd_1$ from the first footprint 40a to the second footprint 42a, a displacement vector $Vd_2$ from the second footprint 42a to the first footprint 40b, a displacement vector $Vd_3$ from the first footprint 40b to the second footprint 42b, and a displacement vector $Vd_4$ from the second footprint 42b to the first footprint 40c. With reference to the first footprints 40a-40c, the footprint location system obtains the total displacement vector of user's four steps by summing up displacement vectors $$Vd_1 - Vd_4 \left(\sum_{i=1}^{4} Vdi\right).$$

The footprint location system of the present invention uses "time-of-flight" and "triangulation" technologies to obtain the coordinates of the footprints. First of all, the ultrasonic infrared transmitter 14 transmits infrared signal and ultrasonic signal simultaneously. The ultrasonic infrared receiver 12 then sequentially receives the infrared signal and ultrasonic signal. The time difference (ultrasonic signal's time-of-flight) between these two signals is measured to calculate the distance between the ultrasonic infrared transmitter 14 and the ultrasonic infrared receiver 12. The footprint location system of the present invention then uses triangulation technology to obtain the coordinates of the ultrasonic infrared transmitter 14 relative to the local coordinate system at the first footprints 40a-40c.

Figure 4B:
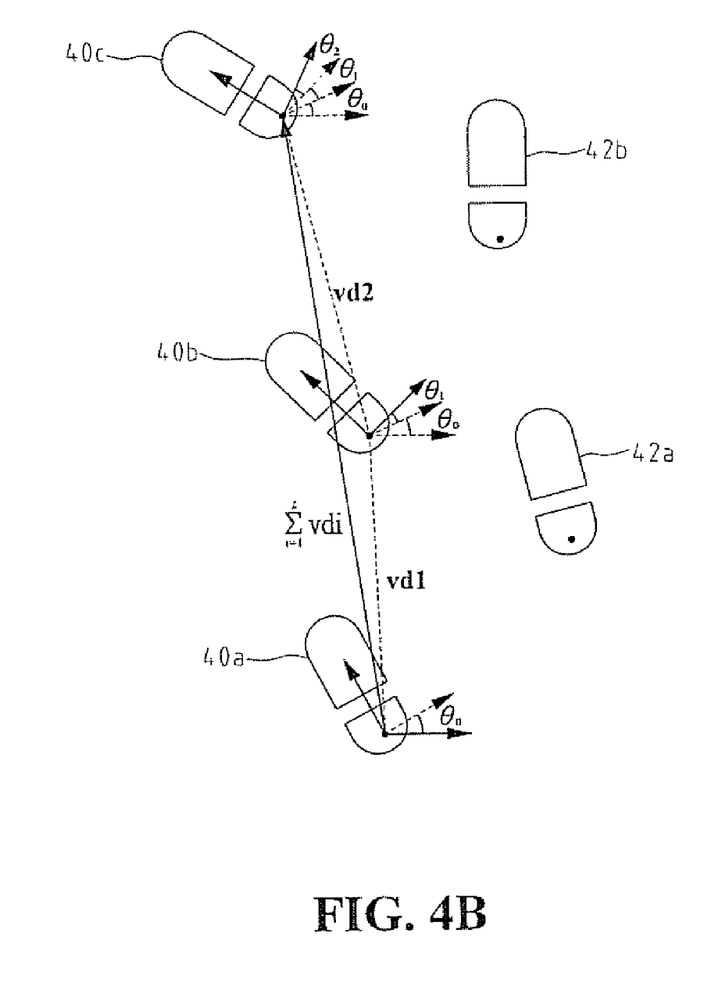

The user doesn't always walk in a straight line and changes the walking directions during his/her movement As shown in FIG. 4B, the footprint location system uses rotation angles $\theta i$ to describe the rotation of the local coordinate system at each first footsteps 40a-40c relative to the previous one. By employing the local coordinate system's rotation angles $\theta_0$-$\theta_2$, the footprint location system transforms Vdi from the local coordinate systems into a global coordinate system as shown in FIG. 4B.

As the first shoe 5a moves, the local coordinate system at the first footprint 40a-40c rotates an angle $\theta i$ and then translates. The rotation angle $\theta i$ is a rotational angle between an i-th first footprint's local coordinate system and a (i−1)-th first footprint's local coordinate system The accumulative rotation angle $\theta$ can be obtained by summing up the current and all previous rotation angle $\theta i$. After transforming those local coordinate systems of the first footprints 40a-40c to the global coordinate system, the footprint location system obtains displacement vectors $Vd_1$-$Vd_4$ in the global coordinate system, and then calculates the user's position at the 4th step as shown in FIG. 4B.

In order to find the rotation angle $\theta i$ and the translation (dx, dy), which are necessary for the coordinate system transformation, we need at least three equations. The first shoe 5a having at least two ultrasonic infrared receivers 12 and the second shoe 5b having at least two ultrasonic infrared transmitters 14 can give sufficient equations to solve the three unknowns.

Figure 5A:
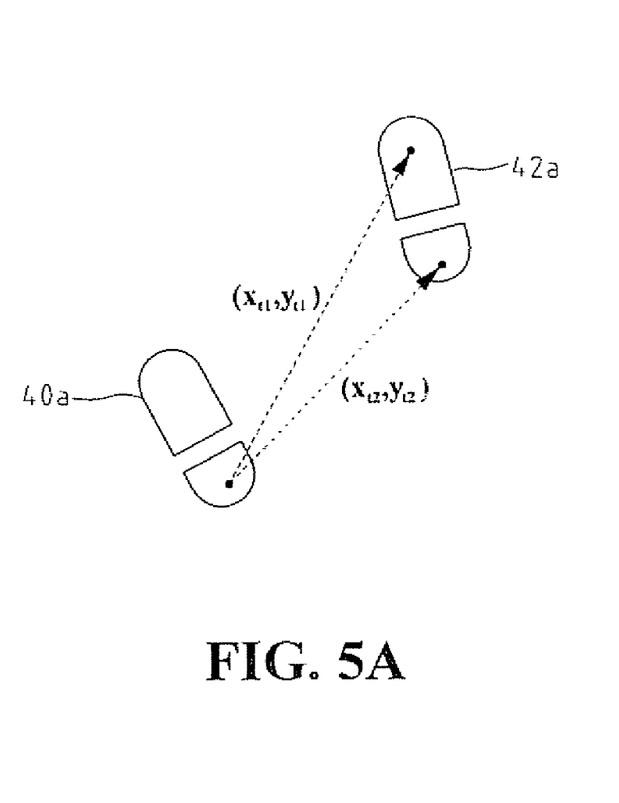
FIGS. 5A and 5B are schematic views showing measured coordinates of the footprint location system according to the present invention.
Figure 5B:
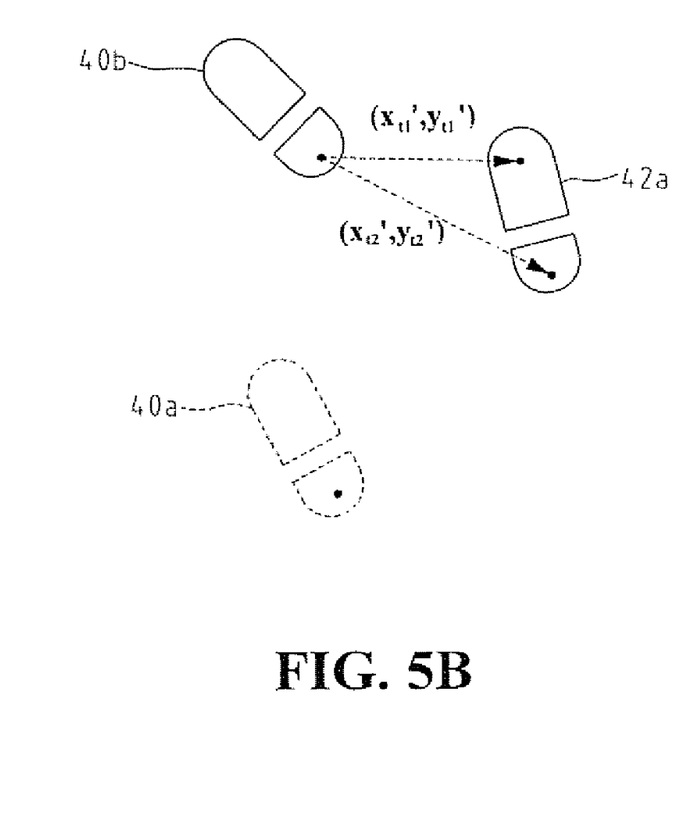

Referring to FIG. 5A, the $(x_{t1}, y_{t1})$ and $(x_{t2}, y_{t2})$ are measured coordinates of two ultrasonic infrared transmitters 14 on the second shoe 5b before moving the first shoe 5a. The $(x_{t1}', y_{t1}')$ and $(x_{t2}', y_{t2}')$ are measured coordinates of two ultrasonic infrared transmitters 14 on the second shoe 5b after moving the first shoe 5a (first footprint moved from 40a to 42a). The coordinates $(x_{t1}, y_{t1})$ and $(x_{t2}, y_{t2})$ are relative to the local coordinate system at the first footprints 40a and the coordinates $(x_{t1}', y_{t1}')$ and $(x_{t2}', y_{t2}')$ are relative to the local coordinate system at the first footprints 40b.

Using the coordinates measured above, we can have two matrix equations to solve three unknowns, rotation angle $\theta i$, and translation (dx, dy):

$$\begin{bmatrix} \cos\theta_i & \sin\theta_i \\ -\sin\theta_i & \cos\theta_i \end{bmatrix} \begin{bmatrix} x_{i1} \\ y_{i1} \end{bmatrix} - \begin{bmatrix} dx \\ dy \end{bmatrix} = \begin{bmatrix} x_{i1}' \\ y_{i1}' \end{bmatrix}$$

$$\begin{bmatrix} \cos\theta_i & \sin\theta_i \\ -\sin\theta_i & \cos\theta_i \end{bmatrix} \begin{bmatrix} x_{i2} \\ y_{i2} \end{bmatrix} - \begin{bmatrix} dx \\ dy \end{bmatrix} = \begin{bmatrix} x_{i2}' \\ y_{i2}' \end{bmatrix}$$

Using the accumulative rotation angle $\theta$ obtained from summing up the current and all previous rotation angle $\theta i$, the translation (dx, dy) is transformed to the displacement vector Vd in the global coordinate system:

$$\begin{bmatrix} \cos\theta & \sin\theta \\ -\sin\theta & \cos\theta \end{bmatrix} \begin{bmatrix} dx \\ dy \end{bmatrix} = Vd$$

As described above, when a user wears footwear with the footprint location system of the present invention, the user's position can be easily determined by measuring, tracking and calculating the displacement vectors along a trail of the footprints without additional advanced infrastructure. Moreover because the user's steps are not too large (less than 1.5 meters), the ultrasonic infrared receivers 12 and the ultrasonic infrared transmitters 14 respectively installed on the first shoe 5a and the second shoe 5b can provide with highly accurate coordinates, thereby overcoming many problems found in existing indoor location systems, such as obstacles, multipath effects, signal noises, signal interferences, and dead spots.

The footprint location system of the present invention can also use a first video detection device (a camera device) 16 and a second video detection device (a characteristic picture) 18 to replace the ultrasonic infrared receivers 12 and the ultrasonic infrared transmitters 14. They obtain the coordinates of the first footprints 40a-40c and the second footprints 42a-42b by camera's internal parameters and image processing. Moreover, the first video detection device 16 and the second video detection device 18 can determine whether the first shoe 5a and the second shoe 5b are in contact with ground. After the confirmation of the contact, the foot location system measures the coordinates of the first footprint 40a-40c and the second footprint 42a-42b.

Figure 6A:
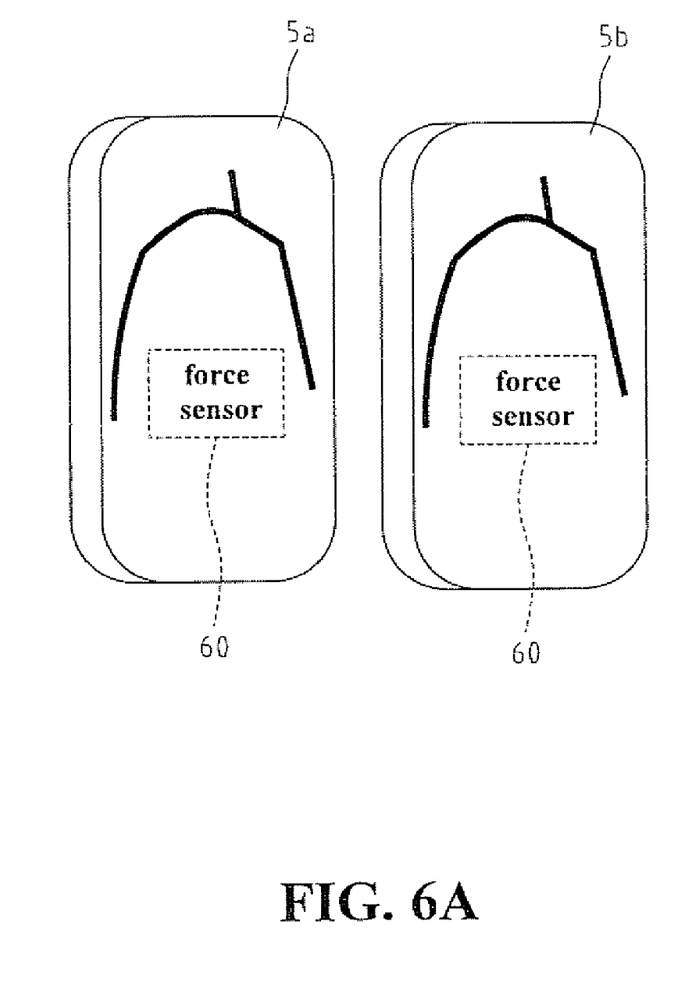
FIGS. 6A-6C are schematic views showing accessory devices of the footprint location system according to the present invention.

Referring to FIG. 6A, the footprint location system of the present invention installs force sensors 60 on the first shoe 5a and the second shoe 5b to confirm the shoes are in contact with ground. The use of pressure sensors 60 can avoid obtaining incorrect displacement vectors under unstable conditions and identify the user moves forward, backward, left or right.

Figure 6B:
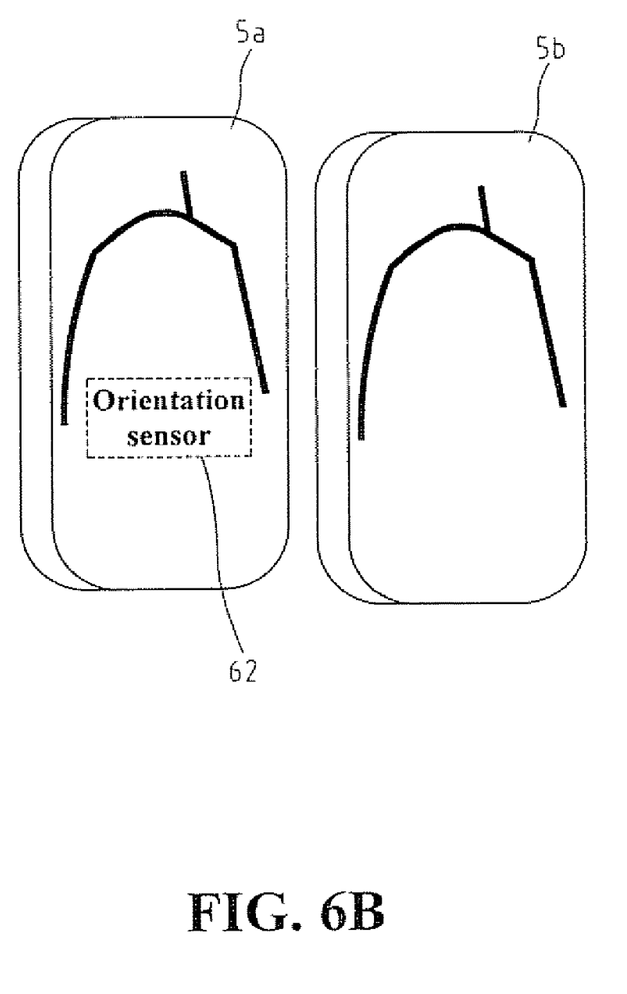

Referring to FIG. 6B, the footprint location system of the present invention installs an orientation sensor 62 on the first shoe 5a. Since the orientation sensor provides with rotation angles in the global coordinate system, it removes one unknown from the calculation Because the unknowns are reduced to the translations (dx, dy), the footprint location system only needs to install one ultrasonic infrared transmitter 14.

Figure 6C:
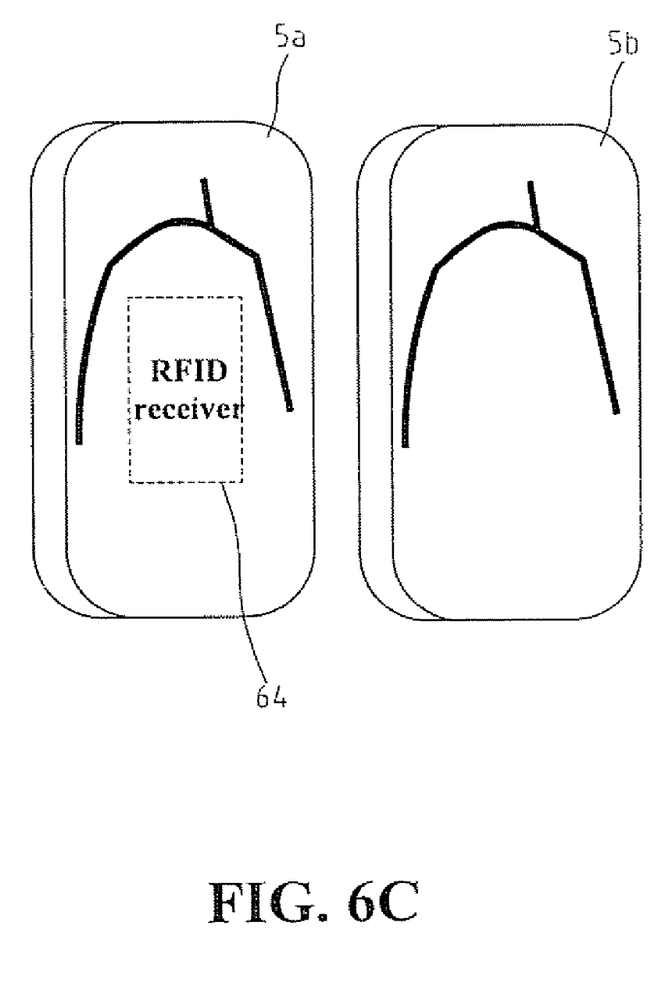

The footprint location system is influenced by many factors and errors accumulate each time displacement vectors calculated. Referring to FIG. 6C, the footprint location system of the present invention installs an RFID reader 64 at the bottom of the first shoe 5a or the second shoe 5b, and a set of RFID tags placed in the grid fashion over the walking range. The RFID tags are with predetermined location coordinates. When the shoe step on top of an RFID tag, the current location of the user is set to the known location coordinate of this RFID tag rather than the calculated footprint location Although the present invention has been described with reference to the preferred embodiments thereof, it is apparent to those skilled in the art that a variety of modifications and changes may be made without departing from the scope of the present invention which is intended to be defined by the appended claims

What is claimed is:

1. A footprint location system for determining a user's position by user's footprints, which include first footprints and second footprints, comprising:

a first shoe comprising a first measuring unit and generating first footprints when both shoes touch the ground at the same time;

a second shoe comprising a second measuring unit and generating second footprints when both shoes touch the ground at the same time;

a vector measuring unit measuring displacement vectors between the first footprints and the second footprints based on coordinates provided by the first measuring unit and the second measuring unit; and a location calculation unit calculating the user's position by summing up all displacement vectors with reference to a starting point, wherein the first measuring unit has at least two ultrasonic infrared receivers and an orientation sensor, which provides a rotation angle .theta. in the global coordinate system;

the second measuring unit has at least one ultrasonic infrared transmitter; and the first measuring unit, the second measuring unit and the orientation sensor measure coordinates and the rotation angle .theta., to calculate a displacement vector in a global coordinate system.

2. The footprint location system as claimed in claim 1, wherein the vector measuring unit measures the displacement vectors based on the measured coordinates under stable conditions, which both shoes are in contact with the ground at the same time.

3. The footprint location system as claimed in claim 1, wherein the first shoe and the second shoe further comprise a force sensor, respectively, for confirming the first shoe and the second shoe in contact with the ground.

4. The footprint location system as claimed in claim 2, wherein the first shoe and the second shoe further comprise a force sensor, respectively, for confirming the first shoe and the second shoe in contact with the ground.

5. The footprint location system as claimed in claim 1, wherein when the user wearing the first shoe and the second shoe walks N steps in uncertain directions, the location calculation unit calculates the user's position based on N displacement vectors of the N steps.

6. The footprint location system as claimed in claim 1, wherein the first measuring unit having a first video detection device or at least two ultrasonic infrared receivers, and the second measuring unit having a second video detection device or at least two ultrasonic infrared transmitters, measure coordinates to calculate a rotation angle θi and a translation (dx, dy) in a local coordinate system;

the rotation angle θi is a rotational angle between an i-th first footprint's local coordinate system and a (i−1)-th first footprint's local coordinate system; and an accumulative rotation angle .theta. summed from the current and all previous rotation angles θi transforms the translation (dx, dy) in the local coordinate system to a displacement vector in a global coordinate system.

7. The footprint location system as claimed in claim 1, wherein the first shoe or the second shoe comprises an RFID reader, and the RFID reader reads RFID tags placed in the environment with accurate preset location information, thereby correcting the user's current position.

8. A footprint location method for determining a user's position by user's footprints, which include first footprints and second footprints, comprising:

providing a first shoe comprising a first measuring unit and generating first footprints when both shoes touch the ground at the same time;

providing a second shoe comprising a second measuring unit and generating second footprints when both shoes touch the ground at the same time;

measuring displacement vectors between the first footprints and the second footprints based on coordinates provided by the first measuring unit and the second measuring unit; and calculating the user's position by summing up the current and all previous displacement vectors with reference to a starting point, wherein the first measuring unit has at least two ultrasonic infrared receivers and an orientation sensors which provides a rotation angle θ in a global coordinate system;

the second measuring unit has at least one ultrasonic infrared transmitter; and the first measuring unit, the second measuring unit and the orientation sensor measure coordinates and the rotation angle θ, to calculate a displacement vector in a global coordinate system.

9. The footprint location method as claimed in claim 8, wherein the displacement vectors are measured based on the measured coordinates under stable conditions, which both shoes are in contact with the ground at the same time.

10. The footprint location method as claimed in claim 8, wherein the first shoe and the second shoe further comprise a force sensor, respectively, for confirming the first shoe and the second shoe in contact with the ground.

11. The footprint location method as claimed in claim 9, wherein the first shoe and the second shoe further comprise a force sensor, respectively, for confirming the first shoe and the second shoe in contact with the ground.

12. The footprint location method as claimed in claim 8, wherein when the user wearing the first shoe and the second shoe walks N steps in uncertain directions, the user's position is calculated based on N displacement vectors of the N steps.

13. The footprint location method as claimed in claim 8, wherein the first measuring unit having a first video detection device or at least two ultrasonic infrared receivers, and the second measuring unit having a second video detection device or at least two ultrasonic infrared transmitters, measure coordinates to calculate a rotation angle θi and a translation (dx, dy) in a local coordinate system;

the rotation angle θi is a rotational angle between an i-th first footprint's local coordinate system and a (i−1)-th first footprint's local coordinate system; and an accumulative rotation angle .theta. summed from the current and all previous rotation angles θi transforms the translation (dx, dy) in the local coordinate system to a displacement vector in a global coordinate system.

14. The footprint location method as claimed in claim 8, wherein the first shoe or the second shoe comprises an RFID reader, and the RFID reader reads RFID tags placed in the environment with accurate preset location information, thereby correcting the user's current position.

* * * * *